United States Patent [19]

Voelzke

[11] Patent Number: 4,905,237
[45] Date of Patent: Feb. 27, 1990

[54] COMMUNICATIONS SYSTEM COMPRISING AN ISDN TERMINAL EQUIPMENT CONNECTION FOR DIFFERENT ISDN INTERFACES IN AN ISDN SWITCHING EQUIPMENT NETWORK

[75] Inventor: Eckhard Voelzke, Gruenwald, Fed. Rep. of Germany

[73] Assignee: Siemens Aktiengesellschaft, Berlin and Munich, Fed. Rep. of Germany

[21] Appl. No.: 222,044

[22] Filed: Jul. 21, 1988

[30] Foreign Application Priority Data

Aug. 4, 1987 [DE] Fed. Rep. of Germany ....... 3725841

[51] Int. Cl.$^4$ .......................... H04J 3/02; H04Q 11/04
[52] U.S. Cl. ................................. 370/110.1; 370/58.1; 370/5
[58] Field of Search .................. 370/85, 110.1, 58, 60, 370/5

[56] References Cited

U.S. PATENT DOCUMENTS

| 4,562,573 | 12/1985 | Murano et al. | 370/85 |
| 4,592,045 | 5/1986 | Fundneider | 370/110.1 |
| 4,722,082 | 1/1988 | Furuya et al. | 370/85 |
| 4,792,800 | 12/1988 | Fujioka et al. | 370/85 |

OTHER PUBLICATIONS

ISDN User-Network Intervaces-Reference Configurations pp. 125-131.
ISDN User-Network Interfaces: Layer 1 Recommendations pp. 141-169.
ISDN User-Network Interfaces Interface Structures and Access Capabilities One p.-FIG. 5/L411.

Primary Examiner—Douglas W. Olms
Assistant Examiner—Min Jung
Attorney, Agent, or Firm—Hill, Van Santen, Steadman & Simpson

[57] ABSTRACT

In ISDN switching equipment networks, the connection of an ISDN terminal equipment (TE) occurs either through a two-wire interface ($U_o$) or through a four-wire interface ($S_o$). The ISDN terminal equipment (TE) is formed such that either the $U_o$ or the $S_o$ interface is connectable through a single interface connection. A detector means (DE), a plurality of switch means (SM) and an additional power supply (S) are connected to the ISDN terminal equipment (TE) such that the connection of a $U_o$ interface or $S_o$ interface is automatically detected and is gated to a $U_o$ terminating equipment ($U_oE$) or to an $S_o$ terminating equipment ($S_oE$). When a $U_o$ interface connection to the ISDN terminal equipment (TE) is detected, then, by using further switch means (SM) and the $S_o$ terminating equipment ($S_oE$), the $U_o$ interface is converted into a $S_o$ interface and is available at an additional plug connector (ZSV) for the purpose of connecting further ISDN terminal equipment (TE). When a $S_o$ interface connection is detected in the ISDN terminal equipment (TE), then further switch means (SM) through-connect the $S_o$ interface ($S_o$) to the additional plug connector (ZSV) for the purpose of connecting further ISDN terminal equipment (TE).

9 Claims, 2 Drawing Sheets

COMMUNICATIONS SYSTEM COMPRISING AN ISDN TERMINAL EQUIPMENT CONNECTION FOR DIFFERENT ISDN INTERFACES IN AN ISDN SWITCHING EQUIPMENT NETWORK

BACKGROUND OF THE INVENTION

1. Field of the Invention

This invention is directed to a communications system which comprises a digital, services-integrating switching equipment and includes two-wire, ISDN transmission (U) interfaces and four-wire, standardized ISDN bus (S) interfaces, and utilizes ISDN terminal equipment that are respectively connected either to an ISDN transmission interface through an ISDN transmission terminating equipment which has layer 1-functions of the OSI reference model for an integrated transmission procedure or to an ISDN bus interface through an ISDN bus terminating equipment which has layer 1-functions of the OSI reference model for an integrated ISDN bus interface, whereby, through a control input provided for this purpose, the ISDN bus terminating equipment is drivable either into an operating mode to obtain the layer 1-functions at the side of the switching equipment or into an operating mode to obtain the layer 1-functions at the side of the ISDN terminal equipment. At the side of the switching equipment, a current source is provided for the remote power supply of the ISDN terminal equipment which is conducted by way of a central office line is coupled directly to the two lines of the two-wire interface or to the phantom circuit for the four-wire ISDN bus interface.

2. Description of the Prior Art

The reference configurations for subscriber lines to services-integrating, digital telecommunications networks—referred to below as ISDN network—are specified in CCITT Recommendation I.411. In accord therewith, an ISDN terminal equipment is brought to a public ISDN switching equipment (ISDN sub-connection) through a central office line and either through a network terminating equipment NTI (main ISDN connection) or via a series circuit of respective network terminating equipment NT1 and NT2. The ISDN base connection of the ISDN terminal equipment occurs by way of a defined ISDN bus interface which is referred to below as a $S_o$ interface, occurring in the network terminating equipment NT1 or, respectively, NT2. The fundamental structure of this four-wire $S_o$ interface is specified in CCITT Recommendation I.412 and the functions to be realized correspond to CCITT Recommendation and I.430. According to CCITT Recommendation I.411, the second network terminating equipment NT2 can be an ISDN private branch exchange or a local network. This means that ISDN terminal equipment are to be generally connected with a $S_o$ interface—to an ISDN private branch exchange as well—in general according to CCITT Recommendation I.430.

Since the distance, about 150 meters, that can be maximally bridged by the $S_o$ interface lines is not adequate to connect more remote ISDN terminal equipment to an ISDN private branch exchange and since the central office lines to the terminal equipment that are predominantly executed in two-wire form in private branch exchange networks prevent a four-wire connection of a $S_o$ interface, these must be brought to the ISDN private branch exchange with suitable transmission equipment through the central office lines that are partly present in two-wire fashion. A special transmission procedure is utilized on the branch central office line for this purpose, this special transmission procedure, utilized in the proximity of the ISDN terminal equipment, conditions a transmission terminal equipment. At the side of the ISDN private branch exchange, the information to be communicated are edited and are transmitted to the relocated transmission terminal equipment through the central office line with the special transmission procedure. The received information are regenerated in this relocated transmission terminal equipment and are shaped such that they meet the conditions of CCITT Recommendation I.430—as already set forth—i.e. that the ISDN terminal equipment can be operated through a $S_o$ interface at the ISDN private branch exchange. In addition to the further transmission terminal equipment, this requires a $S_o$ matching function. This must be added to every remote ISDN terminal equipment or, respectively, to every ISDN terminal equipment which is only connectably by way of a two-wire central office line for connection to an ISDN private branch exchange to the transmission terminal equipment, and is added as an external, complicated line adapter unit—referred to below as PT (private network termination) equipment.

One possibility of avoiding a PT equipment in the respective branch central office line is to integrate the PT equipment functions into the respective ISDN terminal equipment. Such an "$U_o$-ISDN terminal equipment", for example, can be an ISDN telephone equipment. The "ISDN terminal equipment central office line" interface to be implemented in the "$U_o$-ISDN terminal equipment" is a transmission system interface. When this transmission system interface is designed as two-wire, then, by analogy to the main ISDN connection, an U-interface that is referred to as $U_o$-interface at the branch connection results. A number of transmission procedures are known for a two-wire transmission of information through the branch central office lines or, respectively, via the $U_o$-interface. These are preferably two-wire duplex transmission with echo compensation frequently utilized in public ISDN networks—for example, defined in the FTZ-Richtlinie 1 R 220 for the territory of the Deutsche Bundespost—as well as the time separation transmission mode or, respectively, burst mode preferred in private branch exchange system networks.

An $U_o$-interface is conducted to a $U_o$ terminating equipment in an $U_o$-ISDN terminal equipment. This $U_o$ terminating equipment realizes the layer 1-functions according to the OSI reference model as well as further transmission-oriented and electrical functions. In detail, for example, these are the impedance matching of the transmission equipment, the bit and frame synchronization, the power supply feed as well as functions for fault isolation such as, for example, test loops. Within the ISDN terminal equipment, this $U_o$ terminating equipment comprises an internal ISDN interface known in a variety of equipment that is conducted to the further-processing units of an $U_o$-ISDN terminal equipment. This interface essentially represents a functional boundary between layer 1 and layer 2 of the ISDN signaling protocol for subscriber lines (D-channel protocol).

By analogy to the $U_o$-ISDN terminal equipment, the $S_o$ interface in an ISDN terminal equipment is conducted to a $S_o$ terminating equipment. The $S_o$ terminating equipment realizes the layer 1-functions for a 4-wire $S_o$ interface. These functions essentially correspond to those of the $U_o$ interface. The $S_o$ interface, however, comprises additional functions for a bus operation of a plurality of $S_o$-ISDN terminal equipment at a $S_o$ connection—public ISDN network or ISDN private branch exchange. At the exchange equipment side, bus administrators are allocated to the $S_o$ interface and, by contrast, bus user functions are allocated thereto at the side of the ISDN terminal equipment. The differences are in the procedures for access control. Typically, the $S_o$ terminating equipment has access to a control input through which it can be set to an operating mode of the exchange equipment side or, respectively, to an operating mode of the ISDN terminal equipment side. Inside an ISDN terminal equipment, a $S_o$ terminating equipment comprises an internal ISDN interface corresponding to or, respectively, identical to the $U_o$ terminating equipment, this internal ISDN interface being likewise connected to further-processing units of an ISDN terminal equipment.

In order to guarantee, for example, basic voice communication in the ISDN terminal equipment independently of an external energy supply, the ISDN terminal equipment must be supplied with current or, respectively, voltage from the central office line—as in traditional telephone networks as well. To this end—for example, in an ISDN private branch exchange—the current source at the side of the exchange equipment network is directly connected to the two lines with a two-wire $U_o$ interface and, with a four-wire $S_o$ interface, is coupled to a phantom circuit formed for this purpose. A phantom circuit and the coupling of the current source to the phantom circuit are described in detail in CCITT Recommendation I.430.

It is generally valid that an ISDN terminal equipment must be connected to an ISDN switching equipment either through a $U_o$ interface or through a $S_o$ interface depending on the existing ISDN network interface.

SUMMARY OF THE INVENTION

It is an object of the invention to provide an ISDN terminal equipment with portability at low cost so that it can be inserted into an arbitrary ISDN environment.

The essential idea of the invention is that an ISDN transmission terminating equipment and an ISDN bus terminating equipment are allocated to the ISDN terminal equipment realized in the ISDN terminal equipment or in an external line unit and that one of the terminating units the ISDN interface by means of detector means which identifies whether an $U_o$-interface and a $S_o$ interface is currently connected and by means of a switch means—for example, relays—which are controlled by the detector means.

In order to be able to identify the type of connected interface ($U_o$) or ($S_o$) and, thus, the type of coupling of the current source, the detector means can be directly connected to the conductors of a $U_o$ interface and to the phantom circuit of a $S_o$ interface. In an advantageous manner of connecting the detector means, the coupling of a current source at the side of the exchange equipment can be detected with simple voltage, current or with impedance measurements. A coupling of the detector means at, for example, some other location of the phantom circuit or with opto-couplers is also possible but means additional cost either in the coupling of the detector means or in the measurement of the type of coupling of the current source.

A further advantageous improvement comprises a specific, structural design of the ISDN interfaces. By using identically constructed plug connections or, respectively, plug terminals for both interfaces at the side of the switching equipment as well as at the side of the ISDN terminal equipment, an ISDN terminal equipment can be connected to one of the ISDN interfaces through a single plug connection allocated to the ISDN terminal equipment.

A significant, advantageous improvement of the invention comprises a possibility of using already existing equipment—such as the detector means including the connection to an ISDN interface and the ISDN terminating equipment—as well as using a few additional means such as switch means and an additional plug terminal for a further interface, of additionally converting a $U_o$ interface which is connected to the ISDN terminal equipment into a $S_o$ interface and of gating it to an additional plug terminal for the purpose of connecting further ISDN terminal equipment. As a result of connecting an additional current source to the phantom circuit of the additionally formed $S_o$ interface, the additional interface corresponds to $S_o$ interface at the side of the ISDN switching equipment. A particular advantage obtainable on the basis of the conversion is that the bus capability of a $U_o$ interface of an ISDN connection that is not established is reacquired with the additional $S_o$ interface.

A further significant and advantageous improvement of the invention is the through-connection of a $S_o$ interface that is connected to the ISDN terminal equipment and detects an additional interface allocated to the ISDN terminal equipment. An additional coupling of the current source to the phantom circuit of the electrical connected $S_o$ interface is not required since the power supply is coupled at the side of the exchange equipment is effective up to the $S_o$ interface of the additional plug connection. By using the combination of the advantageous improvements of the invention, thus, either the $U_o$ interface is converted into a $S_o$ interface or a through-connected $S_o$ interface can be gated to an additional plug connection.

According to another advantageous improvement of the invention the detector means, the switch means, the ISDN terminating equipment, an additional current source and the interface plug connections are integrated in the ISDN terminal equipment. This measure results in that identically constructed ISDN terminal equipment can be utilized for connection to a $U_o$ interface or, respectively, to a $S_o$ interface. Together with the automatic connection of the existing ISDN interface to the corresponding terminating equipment this advantageous embodiment of the invention represents a considerable improvement for an ISDN user in manipulating an ISDN terminal equipment and represents a considerable improvement of the portability of an ISDN terminal equipment since ISDN terminal equipment are respectively connectable to each of the ISDN interfaces at the side of the switching equipment network by simple plugging in a single, standardized plug connector or, respectively, a single, standardized plug terminal.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

DESCRIPTION OF THE PREFERRED EMBODIMENT

Let it be assumed in the exemplary embodiment either a $S_o$ interface $S_o$ which corresponds to CCITT Recommendation I.430 in its interface structure and procedures are conducted from an ISDN switching equipment public network or ISDN private branch exchange to an ISDN terminal equipment TE, or a $U_o$ interface $U_o$ is connected from a private branch exchange to an ISDN terminal equipment TE.

Both the two-wire interface $U_o$ as well as the four-wire interface $S_o$ are connected to the ISDN terminal equipment TE through an identically constructed standardized plug connector SV and through central office lines AL. A plurality of plug terminals SA are arranged in the plug connector SV at both the exchange side as well as the ISDN terminal equipment side. The two-wire $U_o$ interface $U_o$, for example, is brought to the ISDN terminal equipment TE through the third and sixth plug terminals SA of the plug connector SV and the $S_o$ interface $S_o$ is brought to the ISDN terminal equipment TE through the third through sixth plug terminals SA of the plug connector SV. The branch lines AL, respectively, coming from the third and sixth as well as fourth and fifth plug terminals SA are each connected to a feeder reactor SD in the ISDN terminal equipment TE.

Figure 1:
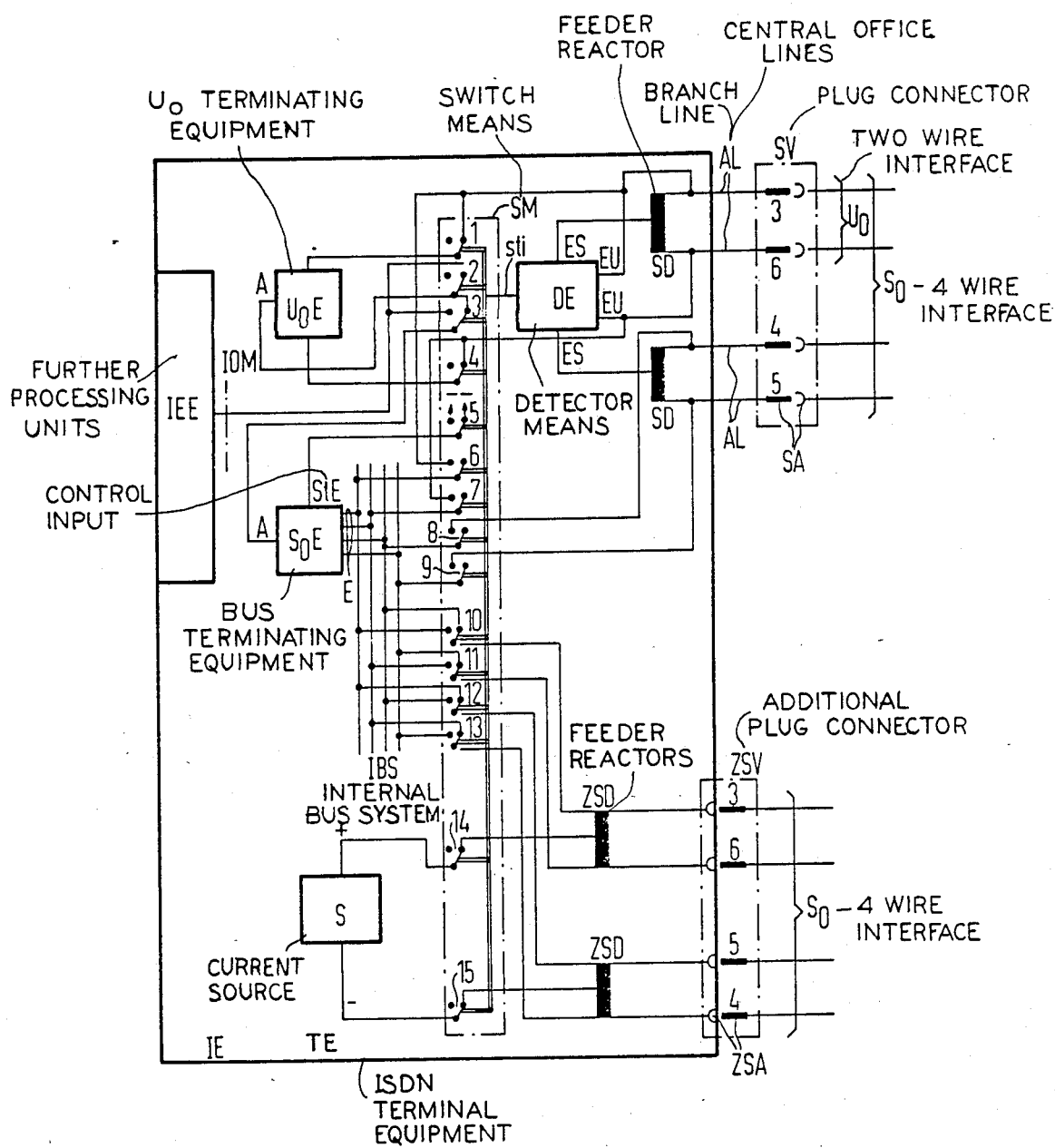
FIG. 1 is a block circuit diagram shows the system components of an ISDN terminal equipment.
Figure 2:
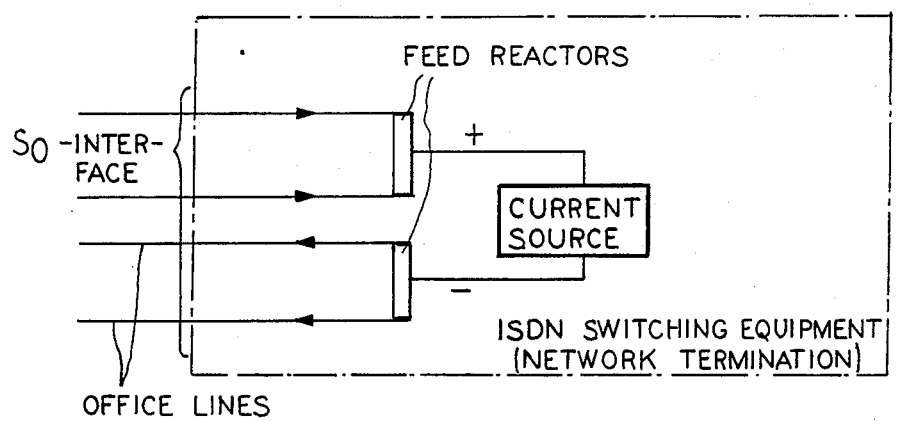
FIG. 2 is a block diagram showing the termination of a current source to a $S_o$-interface in the digital service integrated switching equipment; and, FIG. 3 is a block diagram showing the termination of a $V_o$-interface.
Figure 3:
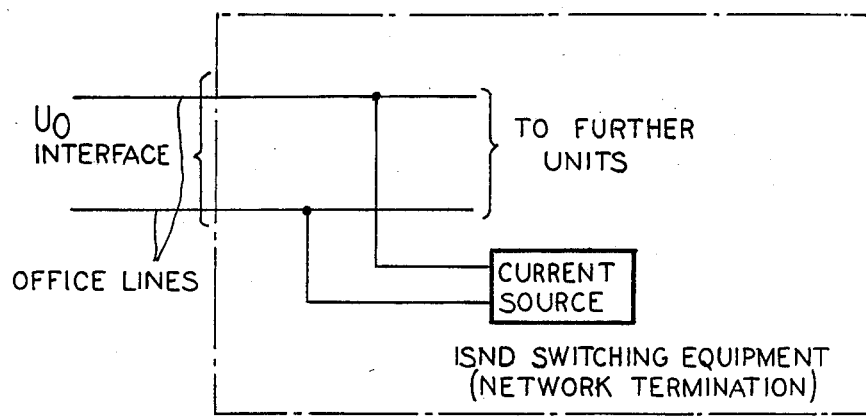

The feeder reactors SD essentially serve the purpose of coupling the phantom circuit of the four-wire interface $S_o$ out with the center taps arranged in the feeder reactors SD. Identically constructed feeder reactors (as shown in FIG. 2) are connected to the four-wire interface $S_o$ at the side of the switching equipment as shown in FIGS. 2 and 3. A current source by means of which a remote feed of the ISDN terminal equipment TE occurs through the branch lines is connected to the phantom circuit of the two feeder reactors. In certain operating conditions, the current source is coupled to the phantom circuit of $S_o$ interface $S_o$ with a prescribed polarity. When outage of the direct power supply of the equipment (NT1 or, respectively, PT) occurs at the exchange side remote feed results with reduced power from the respective exchange equipment (public ISDN network or, respectively, ISDN private branch exchange) and to restricted ISDN terminal equipment operation, for example restricted to telephone mode. The current source has its exchange equipment side coupled to the phantom circuit of the interface $S_o$ with reversed polarity. At the two-wire interfaces $U_o$, the current source has its exchange equipment side directly coupled to the two interface lines as shown in FIG. 3. In the ISDN terminal equipment TE, both the two line conductors through which the interface $U_o$ is brought to the ISDN terminal equipment TE as well as the phantom circuit of the interface $S_o$ that is coupled out at the side of the ISDN terminal equipment are connected to the corresponding inputs ES, EU of a detector means DE.

The type of coupling of the current source at the side of the exchange equipment which is present is determined in the detector means DE by using simple voltage, current or impedance measurements and which of the two interfaces $U_o$, $S_o$ is currently connected to the ISDN terminal equipment TE can be determined. For example, the coupled current source can be detected in the detector means DE with a simple voltage measurement between the individual inputs E of the detector means DE. When the current source is connected, the measured voltage exceeds a prescribed threshold. For example, this upward trend is evaluated in a comparator circuit and is displayed. The detector means DE can be a simple combination of known, discrete components or integrated circuits. A control information signal sti which indicates the $U_o$ or $S_o$ interface connection is subsequently formed in the detector means DE and is forwarded to a switch means SM through an appropriate connection. For example, this switch means SM can be realized with relays or integrated circuits and must comprise at least fifteen switch over functions. Let it be assumed for the exemplary embodiment that the fifteen switchover functions are realized by fifteen switchover relay contact sets—referred to below as switchovers.

The figure shows the switchovers in the position in which they are driven during connection of an interface $U_o$ to the ISDN terminal equipment TE. In the shown switch position, the branch lines AL connected to the $U_o$ interface are connected to an ISDN transmission terminating equipment $U_oE$—referred to below as $U_o$ terminating equipment—with appropriate connections through first and fourth switchovers 1, 4. The layer 1-functions that have already been set forth are realized in this $U_o$ terminating equipment. The output A of the $U_o$ terminating equipment $U_oE$ is connected both to a switchover contact of a second switchover 2 as well as to a switchover contact of a third switchover 3. In the shown switch position, the output A of the $U_o$ terminating equipment $U_oE$ is connected both to an output A of an ISDN bus terminating means—referred to below as $S_o$ terminating equipment—as well as to the further-processing units IEEE of the ISDN terminal equipment TE through an internal ISDN interface IOM. The layer 1-functions of CCITT Recommendation I.430 which have already been set forth are essentially realized in the $S_o$ terminating equipment.

A control input STE arranged at the $S_o$ terminating equipment $S_oE$ is connected to a center contact of a fifth switchover 5 through an appropriate connection. For example, two different voltage potentials are brought to the two switchover contacts of the fifth switchover 5 and these different voltage potentials inform the $S_o$ terminating equipment $S_oE$ whether it should react like a $S_o$ terminating equipment $S_eE$ at the side of the exchange equipment or like the side of an ISDN terminal equipment—as already set forth. The inputs of the $S_o$ terminating equipment $S_oE$ that realize a $S_o$ interface are conducted to an internal bus system IBS. With this bus system, the four branch lines AL—assuming connection of an interface $S_o$—can be gated to the inputs E of the $S_o$ terminating equipment $S_oE$ through sixth through ninth switchovers 6 through 9 and the inputs of the $S_o$ terminating equipment $S_eE$ can be gated to an additional plug connector ZSV through tenth through thirteenth switchovers 10 through 13 and through additional feeder reactors ZSD.

In the illustrated switch positions—denoting connection of a $U_o$ interface to the ISDN terminal equipment TE—the $S_o$ interface existing at the inputs E of the $S_o$ terminating equipment $S_oE$ is conducted to the additional plug connector ZSV of the ISDN terminal equipment TE, and as a result an interface $S_o$ occurres at the ISDN terminal equipment TE.

In order to obtain an equivalent interface $S_o$ at the ISDN terminal equipment TE at the side of the exchange equipment, a current source S is coupled through fourteenth and fifteenth switchovers 14, 15 to the center taps of the additional feeder reactors ZSD or, respectively, to the phantom circuit of the interface $S_o$. For example, the energy for the current source S can be offered from sources connected to the ISDN terminal equipment TE such as batteries as well as power means supply or by means of a remote feed through the $U_o$ interface $U_o$ which is connected to the ISDN terminal equipment TE. The additional feeder reactors ZSD also meet the conditions of CCITT Recommendation I.430. In the position of the switchovers not shown and which results upon the connection of a $S_o$ interface to the ISDN terminal equipment TE, the four in-coming branch lines are gated to the $S_o$ terminating equipment $S_oE$ through the sixth through ninth switchovers 6 through 9 and are gated to the additional plug connector ZSV through the tenth through thirteenth switchovers 10 through 13. For the purpose of obtaining the bus capability of the $S_o$ interface, the signal is forwarded to the additional plug connector ZSV and is available there for the connection of a further ISDN terminal equipment TE. A connection of the current source S arranged at the side of the ISDN terminal equipment is not required since, due to the electrical through-connection of the $S_o$ interface, the current source connected at the side of the exchange equipment takes effect up to the $S_o$ interface of the additional plug connector. The design and the position of the additional plug terminals ZSA can be both external and at the side of the ISDN terminal equipment, and the additional plug connector ZSV corresponds to the initially described plug connector SV for the connection of a $S_o$ interface to an ISDN terminal equipment TE.

Although the invention has been described with respect to preferred embodiments, it is not to be so limited as changes and modifications can be made which are within the full intended scope of the invention as defined by the appended claims.

I claim as my invention:

1. A communications system comprising, an integrated service digital network switching equipment having two-wire, ISDN transmission (U) interfaces and four-wire, standardized ISDN bus (S) interfaces, and having ISDN terminal equipment which are respectively connected either to an ISDN transmission interface through an ISDN transmission terminating equipment realizing a layer 1-functions of the OSI reference model for an integrated transmission procedure or to one of the ISDN bus interfaces through an ISDN terminating equipment realizing a layer 1-function of the OSI reference model for an ISDN bus interface, whereby, through a control input, an ISDN bus terminating equipment is drivable either into an operating mode realizing the layer 1-function at the side of the switching equipment or into an operating mode realizing the layer 1-function at the side of the ISDN terminal equipment and, at the side of the switching equipment, a current source is provided for the remote power supply of the ISDN terminal equipment connected through a central office line which is coupled directly to the two lines of the two-wire interface or to a phantom circuit of the four-wire ISDN bus interface, characterized in that an ISDN transmission terminating equipment ($U_oE$) and an ISDN bus terminating equipment ($S_oE$) are provided for an ISDN terminal equipment; the current type of connection of the current source at an exchange is identified at the respective interfaces by a detector means (DE) which is connected to the ISDN terminal equipment, and which is also connected to switch means (SM) so as to connect either the ISDN bus terminating equipment ($S_oE$) or the transmission terminating equipment ($U_oE$) to the respective ISDN interface.

2. A communications system according to claim 1, characterized in that the detector means (DE) is directly connected to the lines of an ISDN transmission interface ($U_o$) and to the phantom circuit of an ISDN bus interface ($S_o$).

3. A communications system according to claims 1 or 2, characterized in that both the ISDN bus interface ($S_o$) and the ISDN transmission interface ($U_o$) are provided with identical plug connectors (SV) at the side of the ISDN terminal equipment and at the side of the exchange equipment; and an ISDN terminal equipment (TE) is connectable to both ISDN interfaces ($S_o$, $U_o$) through the same plug connectors (SV).

4. A communication system according to claims 1 or 2 characterized in that the coupling of the current source (S) at the exchange equipment is detected by the detector means (DE) which makes current, voltage or impedance measurements so as to produce a control signal for controlling the switch means (SM).

5. A communications system according to claim 1, characterized in that when the ISDN transmissio terminating equipment ($U_oE$) is connected to the ISDN transmission interface ($U_o$) by further switch means (SM) which are controlled by said detector means (DE), an internal ISDN interface which connects to additional units (IEE) of the ISDN terminal equipment (TE) is connected in parallel to the internal ISDN interface (IOM) of the ISDN bus terminating equipment ($S_oE$) which is connected to said further units (IEE) and to the transmission and reception lines (SL, EL) of the ISDN bus interface ($S_o$) of the ISDN bus terminating equipment ($S_oE$) and to an additional current source (S) are connected to an additional interface in the ISDN terminal equipment (TE) by using further switch means (SM) which are controlled by said detector means (DE) and said additional interface is an ISDN bus interface ($S_o$) of the digital, services-integrating (ISDN)-switching equipment VE; and the ISDN bus terminating equipment ($S_oE$) is driven into an operating mode of the layer 1-functions at the exchange equipment, and is driven by the control input (STI) with further switch means (SM) which are controlled by said detector means (DE).

6. A communications system according to claim 1, characterized in that, by the connection of the ISDN bus terminating equipment ($S_oE$) to the ISDN bus interface ($S_o$) by means of switch means (SM) which are controlled by said detector means (DE), the ISDN bus interface ($S_o$) is connected in parallel to an additional interface in the ISDN terminal equipment (TE) such that said additional interface represents an ISDN bus interface ($S_o$) of the digital, services-integrating (ISDN) telecommunications network; and the ISDN bus terminating equipment ($S_oE$) is driven into an operating mode which is the layer 1-functions at the side of the ISDN terminal equipment, and is driven by said control input (STI) by means of a further switch means (SM) which is controlled by said detector means (DE).

7. A communcations system according to claims 1 or 2 or 5 or 6 characterized in that said detector means (DE), said switch means (SM), said ISDN terminating equipments ($U_oE$, $S_oE$), and an additional current source (S) and an additional ISDN bus interface ($S_o$) are integrated into the ISDN terminal equipment (TE).

8. A communications system according to claims 1 or 2 or 5 or 6, characterized in that said switch means are relays.

9. A communications system according to claims 1 or 2 or 5 or 6 wherein said switch means comprise integrated circuits.

* * * * *